(12) United States Patent
Guemmer

(10) Patent No.: US 8,202,044 B2
(45) Date of Patent: Jun. 19, 2012

(54) BLADE SHROUD WITH PROTRUSION

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 945 days.

(21) Appl. No.: 12/155,950

(22) Filed: Jun. 12, 2008

(65) Prior Publication Data
US 2008/0310961 A1 Dec. 18, 2008

(30) Foreign Application Priority Data
Jun. 14, 2007 (DE) .................. 10 2007 027 427

(51) Int. Cl.
*F01D 25/24* (2006.01)
(52) U.S. Cl. .................. 415/173.7; 415/173.1
(58) Field of Classification Search ........... 415/173.7, 415/170.1, 174.5, 229, 230, 173.1
See application file for complete search history.

(56) References Cited

U.S. PATENT DOCUMENTS

| | | | | |
|---|---|---|---|---|
| 4,844,692 | A | * | 7/1989 | Minkkinen et al. ........ 415/208.1 |
| 5,607,284 | A | * | 3/1997 | Byrne et al. ................ 415/58.5 |
| 6,368,055 | B1 | * | 4/2002 | Matsuda ...................... 415/192 |
| 2003/0007866 | A1 | * | 1/2003 | Ito et al. ..................... 415/182.1 |

* cited by examiner

*Primary Examiner* — Caridad Everhart
(74) *Attorney, Agent, or Firm* — Timothy J. Klima; Shuttleworth & Ingersoll, PLC

(57) ABSTRACT

A fluid-flow machine has a main flow path, in which at least one row of blades (1) is arranged, and a shroud (2) embedded in a cavity (3) of a component, with the component and the blades being in rotary movement relative to each other. The shroud (2), as referred to an axial direction of the fluid-flow machine is arranged between two reference points (A) and (B) at the periphery of the main flow path of the fluid-flow machine and projects beyond a rectilinear connection of the reference points (A) and (B) into the flow path in at least one location of the circumference and in at least one of the areas of the leading or trailing edge of the appertaining blade row.

24 Claims, 22 Drawing Sheets

(State of the art)

(State of the art)

(State of the art)

(State of the art)

(State of the art)

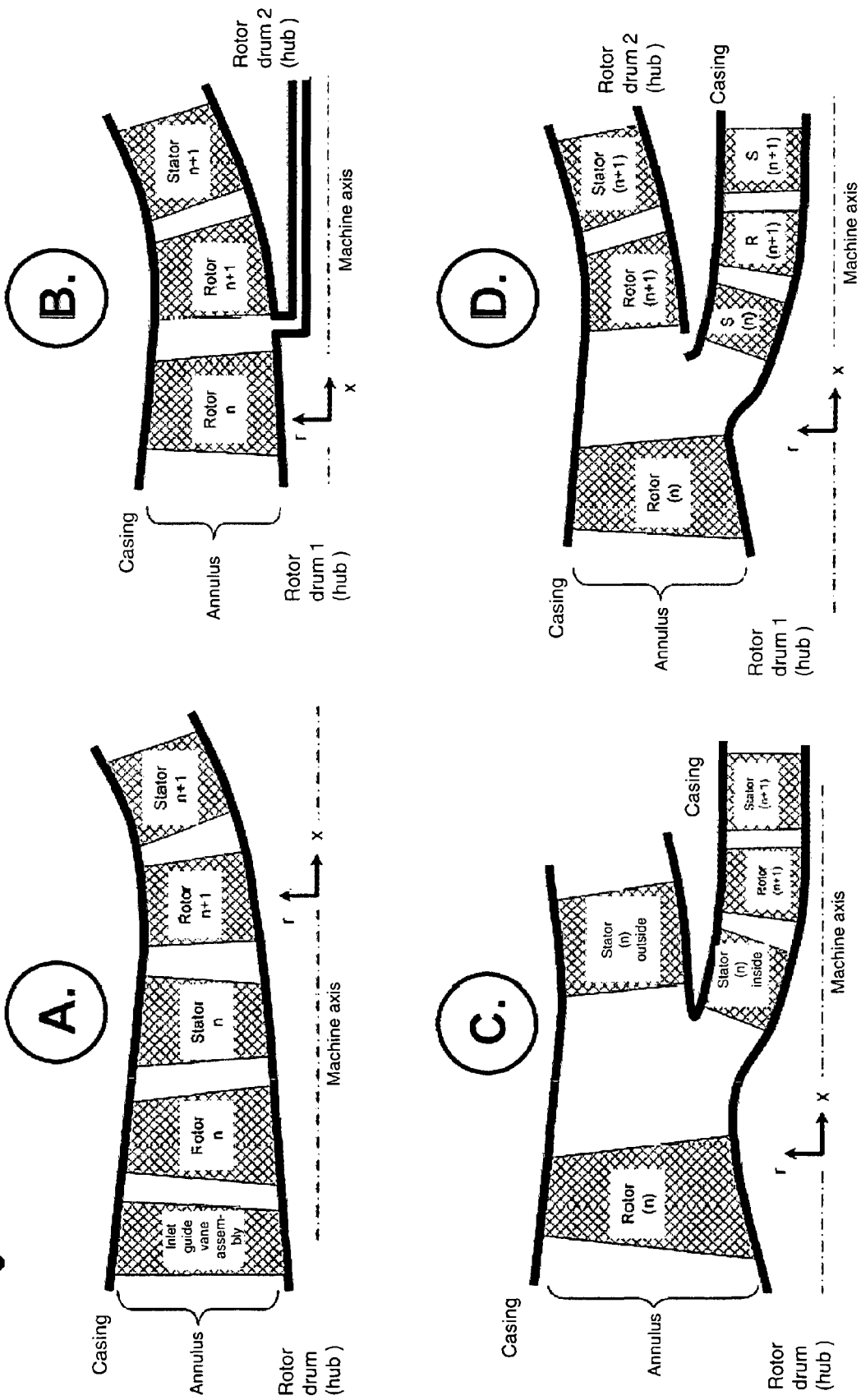

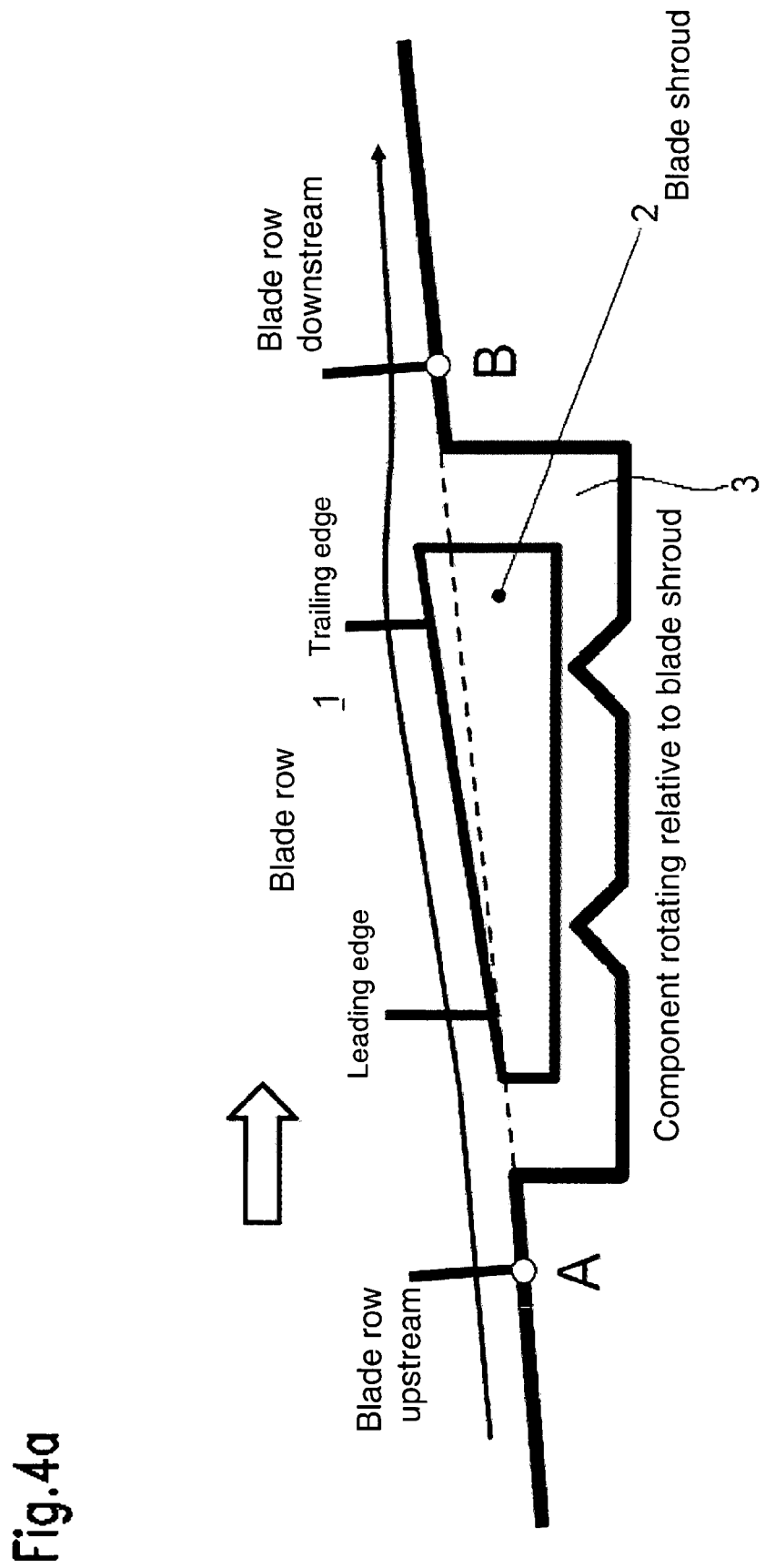

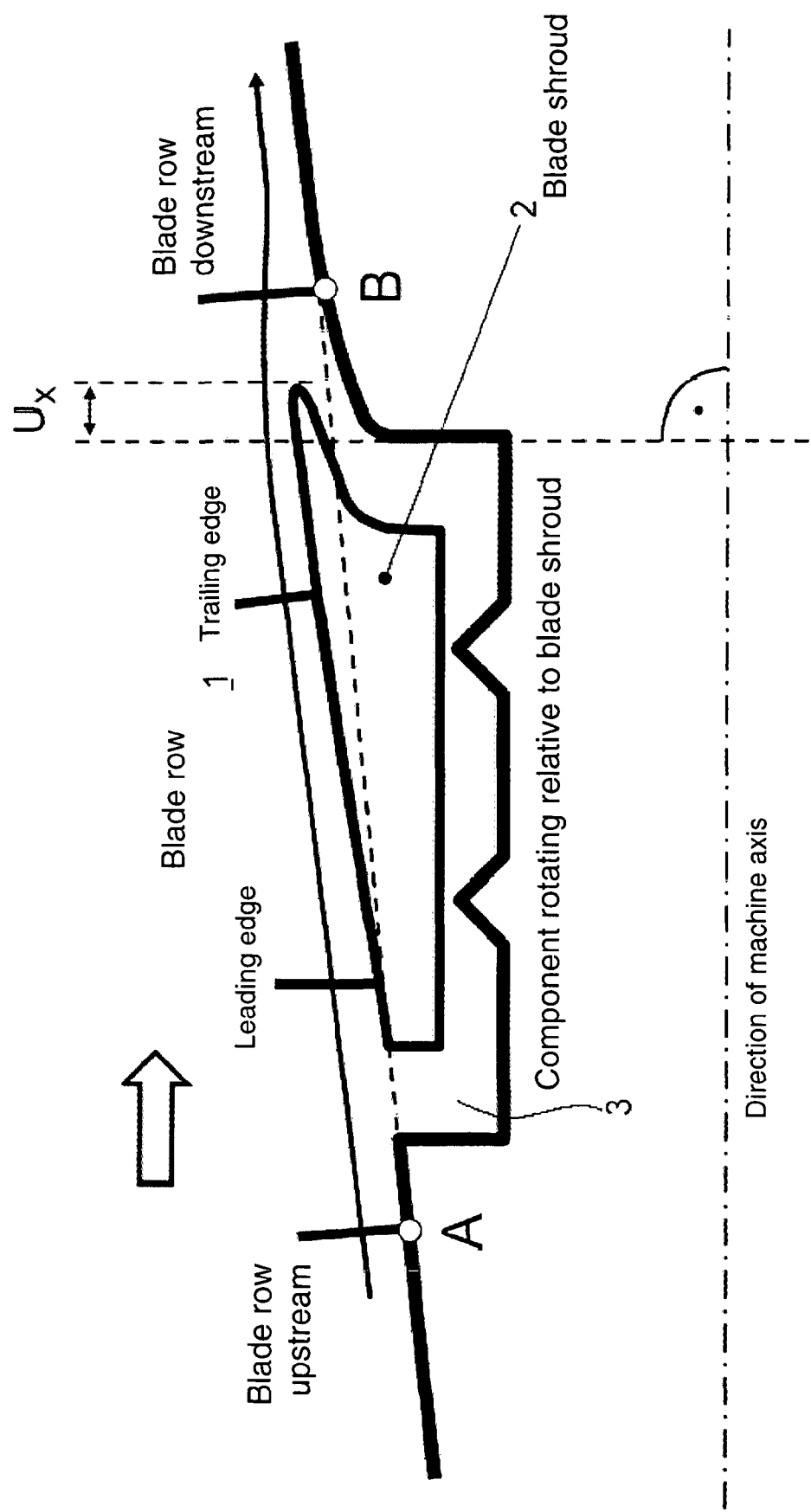

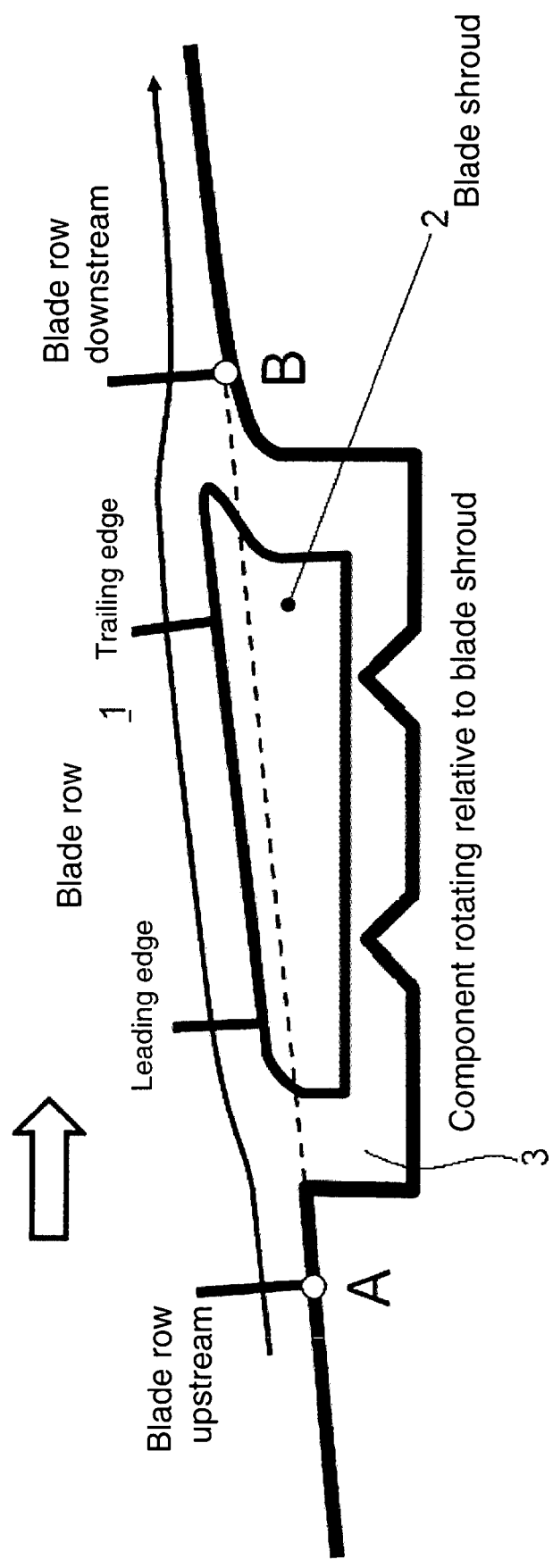

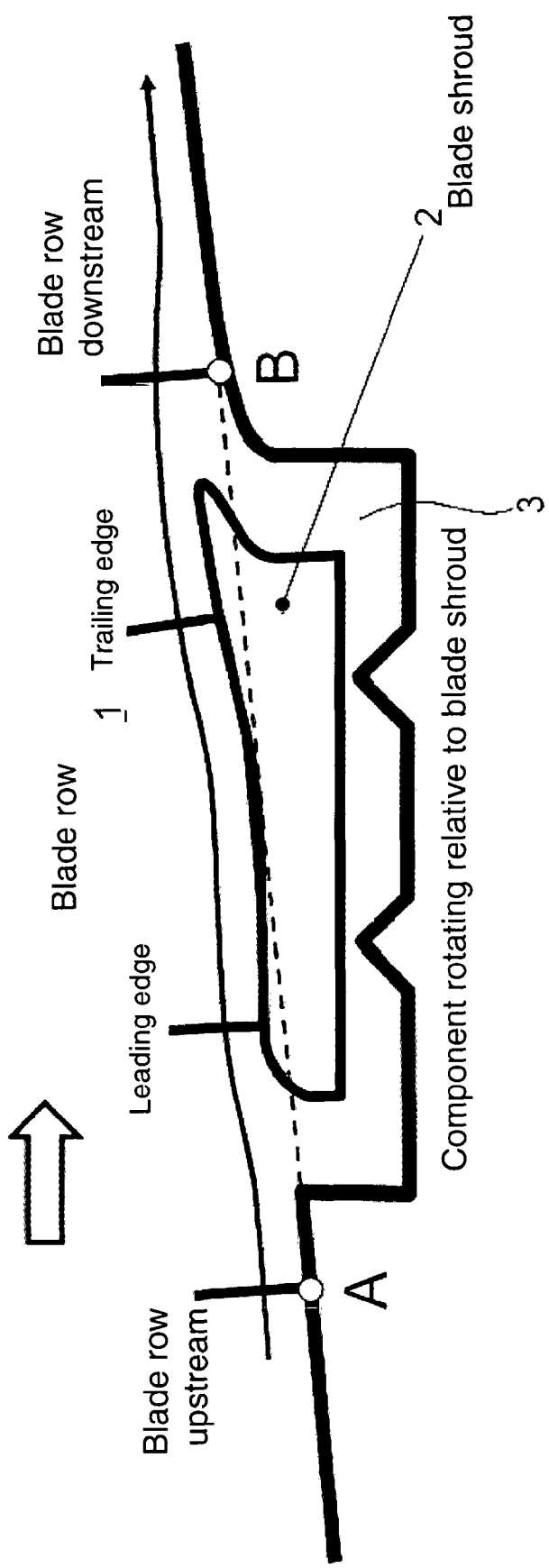

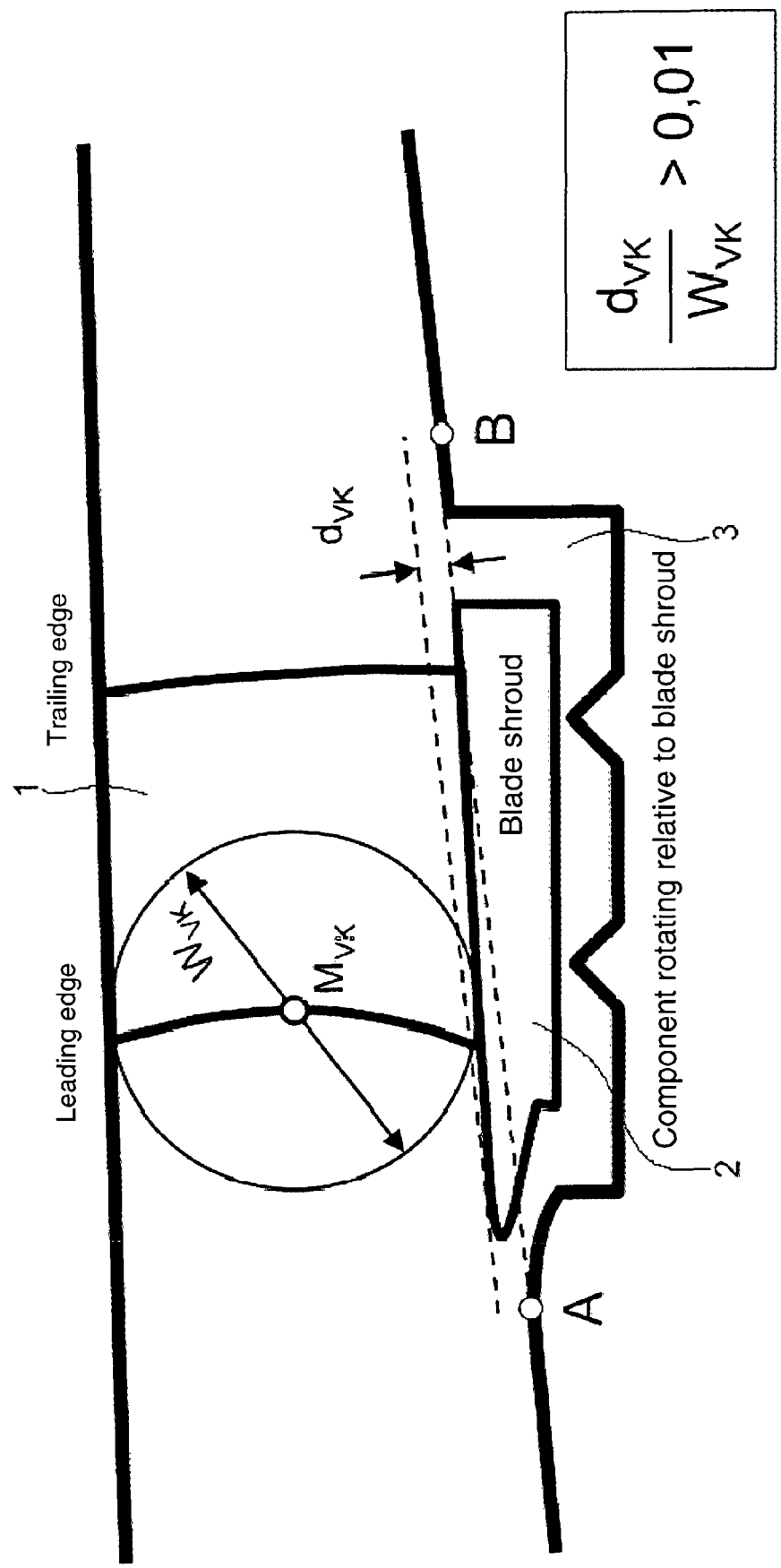

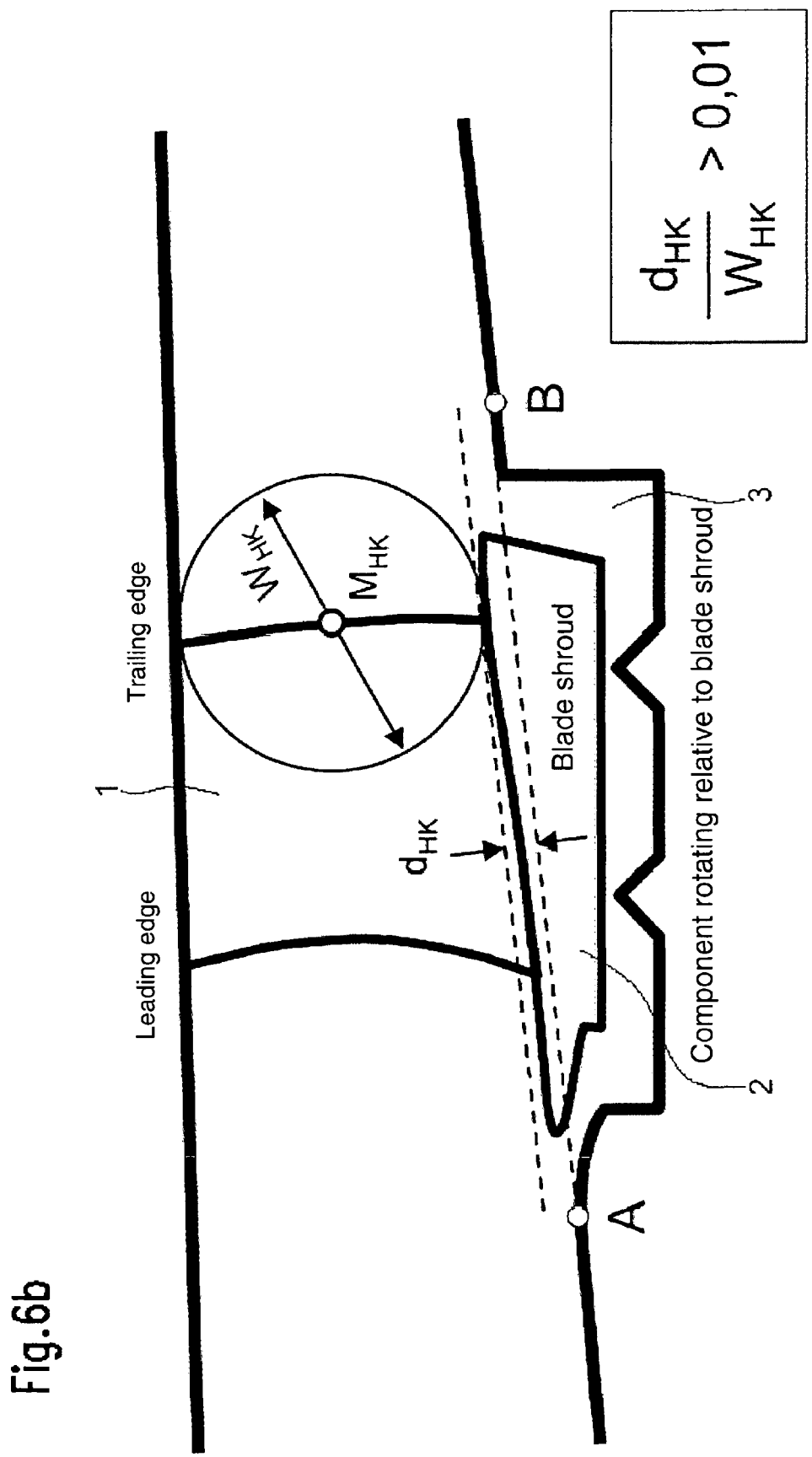

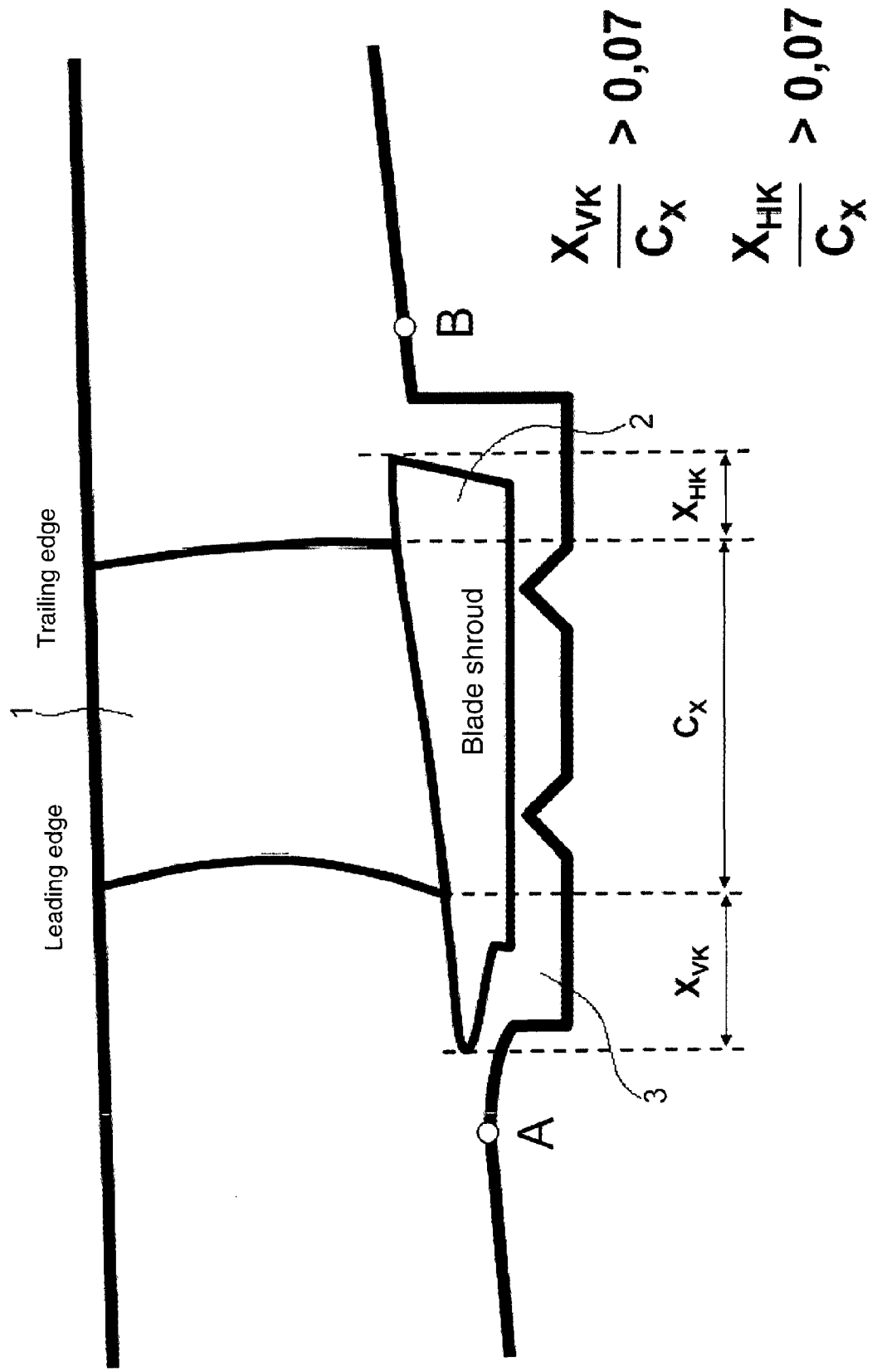

BLADE SHROUD WITH PROTRUSION

This application claims priority to German Patent Application DE102007027427.2 filed Jun. 14, 2007, the entirety of which is incorporated by reference herein.

The present invention relates to blade rows of fluid-flow machines, such as blowers, compressors, pumps and fans of the axial or semi-axial type using gaseous or liquid working media. The fluid-flow machine may include one or several stages, each having a rotor and a stator, or in individual cases, the stage having only a rotor. The rotor includes a number of blades, which are connected to the rotating shaft of the machine and transfer energy to the working medium. The rotor may be designed with or without a shroud at the outer blade ends. The stator includes a number of stationary blades, which may either have a fixed or a free blade end on the hub and on the casing side. The rotor drum and blading are usually enclosed by a casing. The machine may also have a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from outside of the annulus. In an alternative configuration, multi-stage types of said fluid-flow machines may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus divides into two concentric annuli behind a certain blade row, with each of these annuli housing at least one further blade row. FIG. 2 shows examples of four possible configurations of fluid-flow machines.

The aerodynamic roadability and the efficiency of fluid-flow machines, for example blowers, compressors, pumps and fans, is limited by the growth and the separation of boundary layers on the blades as well as on the hub and casing walls. To remedy this fundamental problem, the state of the art provides solutions only to a limited extent. One source of the losses occurring in fluid-flow machines is the leakage flow around blade shrouds as they are frequently provided on the inner blade end of stators or also on the outer blade end of rotors. The leakage flow is usually minimized by sealing fins which are arranged within the cavity, in which the shroud is embedded. Nevertheless, the leakage flow may severely affect the performance of fluid-flow machines, in particular in very highly loaded blade rows which are have a high static pressure increase and, thus, a strong propulsion of the leakage flow.

FIG. 1a schematically shows a section of a fluid-flow machine having a rotor blade row 1 and a stator blade row 1. Particular prominence is given to the shroud arrangement on the outer blade end of the rotor. In accordance with the state of the art, the shroud arrangement 2 has a large cavity 3 which is provided in the casing and completely houses the shroud 2 to make the outer confinement of the main flow path as smooth as possible.

FIG. 1b schematically shows a section of a fluid-flow machine having a fixed stator blade row 1 and a rotor blade row. Particular prominence is given to the shroud arrangement 2 on the inner blade end of the fixed stator. In accordance with the state of the art, the shroud arrangement has a large cavity 3 which is provided in the hub and completely houses the shroud 2 to make the inner confinement of the main flow path as smooth as possible.

FIG. 1c schematically shows a section of a fluid-flow machine having a row of adjustable (variable) stators and a rotor blade row. Particular prominence is given to the shroud arrangement on the inner blade end of the variable stator. In accordance with the state of the art, the shroud arrangement, also in this case, has a large cavity which is provided in the hub and completely houses the shroud to make the inner confinement of the main flow path as smooth as possible.

FIG. 1d shows, typical of the shrouds of variable or fixed rotors and stators, an arrangement of three blade rows at the periphery of the main flow path of a fluid-flow machine including an upstream blade row, a blade row with shroud and a downstream blade row. This representation is applicable to both a region at the casing and a region at the hub of the fluid-flow machine.

The shroud is embedded in a surrounding component or a surrounding assembly (rotor hub or casing) and, according to the state of the art, is arranged in smooth alignment, without protrusion, in the contour of the main flow path. The shroud can be of the solid or hollow type (as not shown here) and includes one or several components. The leakage flow (small arrows) occurring between the shroud and the surrounding component, which is opposite to the main flow direction (bold arrow), is reduced by a number of sealing fins. The sealing fins may be arranged on the surrounding component or also on the shroud itself (as not shown here). The surrounding component and the shroud are usually in relative movement to each other. In the area of the shroud, the leading edge (VK) and the trailing edge (HK) of the blade row considered are indicated. Indicated upstream of the shroud is the trailing edge of the upstream blade row, with the base point of this trailing edge (HK) being marked A. Indicated downstream of the shroud is the leading edge of the upstream blade row, with the base point of this leading edge (VK) being marked B. A thin, long arrow characterizes the peripheral flow along the essentially smooth border of the main flow path. According to the state of the art, the shroud does not protrude beyond the connecting line between A and B into the main flow path. A minimum protrusion, which, however, is secondary in relation to other dimensions of the shroud, may be present in the state of the art due to manufacturing tolerances or also due to thermal detuning of the components at off-design operating points of the fluid-flow machine. As schematically shown in FIG. 1d, the flow in the peripheral area of the of main flow path enters the shrouded blade row without being influenced by a step or other unevenness in the contour and passes without disturbance along the shroud arranged in alignment with the remaining contour.

In the absence of a blade row upstream of the shroud, the position of point A is established by a distance to the leading edge of 25 percent of the axial length Cx at the rim of the shrouded blade row, see FIG. 1e.

In the absence of a blade row downstream of the shroud, the position of point B is established by a distance to the trailing edge of 25 percent of the axial length Cx at the rim of the shrouded blade row, see FIG. 1e.

On shroud arrangements according to the state of the art, the leakage flow is essentially due to the gap formed between the sealing fins and the mating contour. The leakage flow here severely increases with the aerodynamic load selected for the shrouded blade row. This results in bad operating characteristics as regards efficiency, stability and width of the operating range of the fluid-flow machine.

In a broad aspect, the present invention provides for a fluid-flow machine of the type specified at the beginning above, which minimizes shroud leakage flows while avoiding the disadvantages of the state of the art.

More particularly, the present invention relates to the design of a shroud of the blade row of a fluid-flow machine such that, in at least one location of the circumference and in at least one of the areas of the leading or trailing edge, the contour of the shroud protrudes beyond a rectilinear connection of the nearest blade edge root points of environing blade rows so that, in the area of one of the openings by which the shroud cavity connects to the main flow path, a sweep is provided in the main flow path contour and the flow lines at the periphery of the main flow path.

In accordance with the present invention, a shroud arrangement for application in a fluid-flow machine is provided in which a local protrusion in the area of the leading edge and/or the trailing edge additionally influences the flow at the periphery of the main flow path, thereby reducing the pressure differential present at the cavity and controlling the shroud leakage flow.

The present invention is more fully described in the light of the accompanying drawings showing preferred embodiments. In the drawings, FIG. 1a shows a blade according to the state of the art, rotor FIG. 1b shows a blade according to the state of the art, fixed stator FIG. 1c shows a blade according to the state of the art, variable stator FIG. 1d shows a blade shroud configuration, state of the art, with surrounding blade rows FIG. 1e shows a blade shroud configuration, state of the art, without surrounding blade rows FIG. 2 shows possible configurations of fluid-flow machines relevant to the present invention, FIG. 3a shows a shroud configuration in accordance with the present invention, protrusion in the leading-edge area, FIG. 3b shows a shroud configuration in accordance with the present invention, protrusion with nose in the leading-edge area, FIG. 3c shows a shroud configuration in accordance with the present invention, protrusion and overlap in the leading-edge area, FIG. 4a shows a shroud configuration in accordance with the present invention, protrusion in the trailing-edge area, blunted FIG. 4b shows a shroud configuration in accordance with the present invention, protrusion in the trailing-edge area, radiused FIG. 4c shows a shroud configuration in accordance with the present invention, protrusion with tip in the trailing-edge area, FIG. 4d shows a shroud configuration in accordance with the present invention, protrusion with nose in the trailing-edge area, FIG. 4e shows a shroud configuration in accordance with the present invention, protrusion and overlap in the trailing-edge area, FIG. 5a shows a shroud configuration in accordance with the present invention, protrusion in the leading and trailing-edge areas, rectilinear contour within the blade row, FIG. 5b shows a shroud configuration in accordance with the present invention, protrusion in the leading and trailing-edge areas, convex contour within the blade row, FIG. 5c shows a shroud configuration in accordance with the present invention, protrusion in the leading and trailing-edge areas, concave contour within the blade row, FIG. 5d shows a shroud configuration in accordance with the present invention, protrusion and overlap in the leading and trailing-edge areas, FIG. 6a shows the size of the protrusion in the leading-edge area, FIG. 6b shows the size of the protrusion in the trailing-edge area, FIG. 7 shows axial extensions of the shroud in accordance with the present invention, FIG. 8 shows the periodical circumferential variation of the protrusion in the leading-edge area, three-dimensional view.

In a conventional state-of-the-art shroud configuration, as shown in FIG. 1d, the peripheral flow enters the shrouded blade row without being influenced by a step or other unevenness in the contour. Here, the flow passes in an undisturbed way over the openings of the shroud cavity, the side of the shroud facing the main flow path and arranged in line with the upstream and downstream contour. The static pressures present at the cavity openings and controlling the leakage flow are predefined (set values) in such an arrangement.

It is a particular object of the solution according to the present invention to influence the static pressure at the inflow edge and at the outflow edge of the shroud by a special shape of the shroud in the area of the blade leading edge and/or the blade trailing edge such that the static pressure differential between the openings of the cavity and, thus, the leakage flow is reduced or ideally stopped.

Shroud configurations according to the present invention are shown in FIGS. 3a to 5d. Crucial for the present invention is only the contouring of the shroud in the vicinity of the main flow path. The shape of the shroud in the deeper inner of the cavity, in which the shroud is embedded, is not subject matter of the present invention. Also not subject matter of the present invention is the precise shape of the components surrounding the cavity and the form of the sealing fins. For clarity, the above-mentioned, invention-irrelevant characteristics have been outlined herein in simplified form only to the extent necessary for representing and understanding the relevant aspects of the present invention.

FIGS. 3a to 3c show, by way of example, some shroud configurations 2 according to the present invention with protrusion in the area of the leading edge of the respective blade row 1. A protrusion according to the present invention is characterized in that —in at least one freely selectable longitudinal section of the fluid-flow machine —a portion of the shroud 2 projects beyond the connecting line A-B into the main flow path, thereby presenting a distinct resistance to the approaching flow.

Figure 1A:
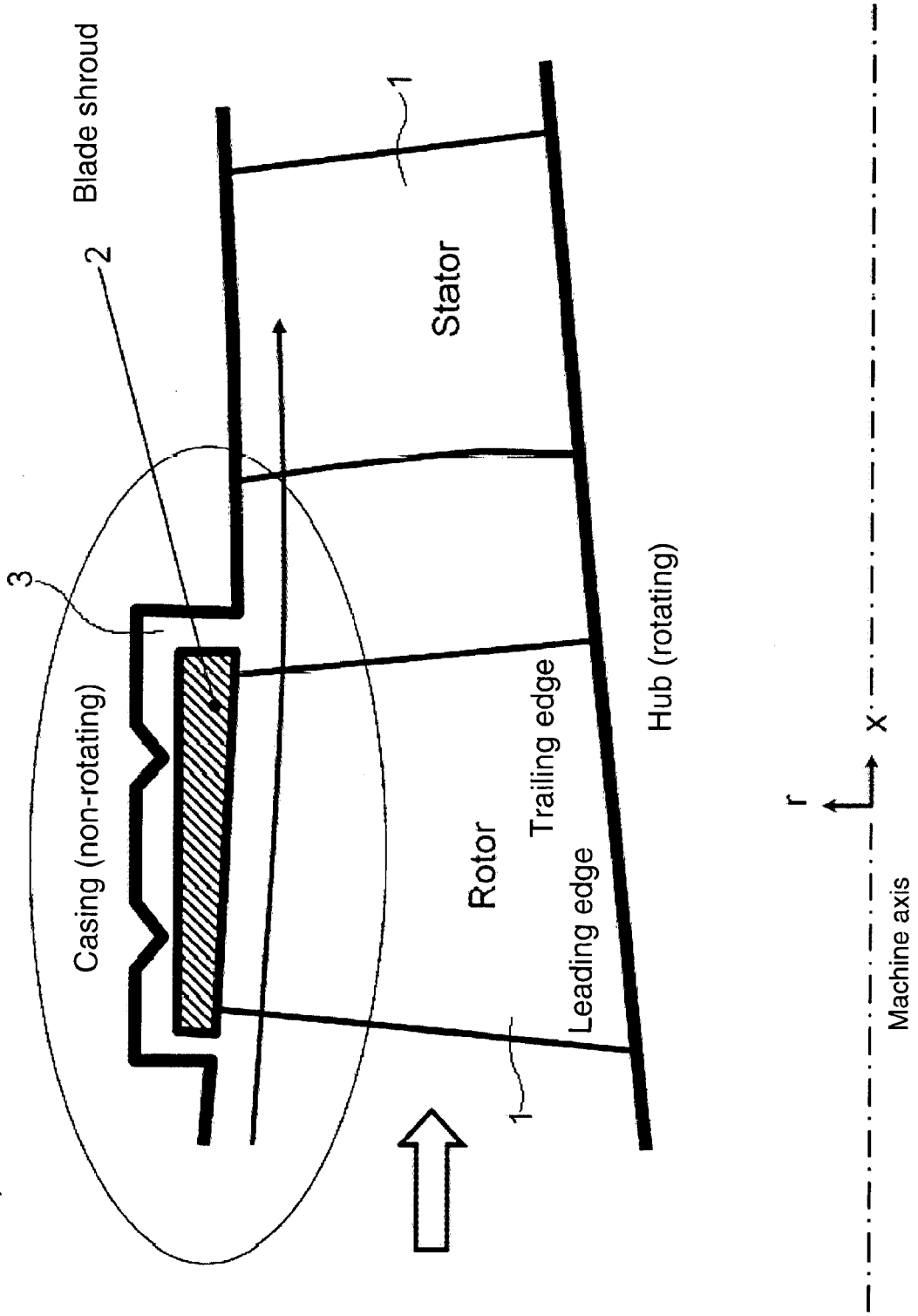
Figure 1B:
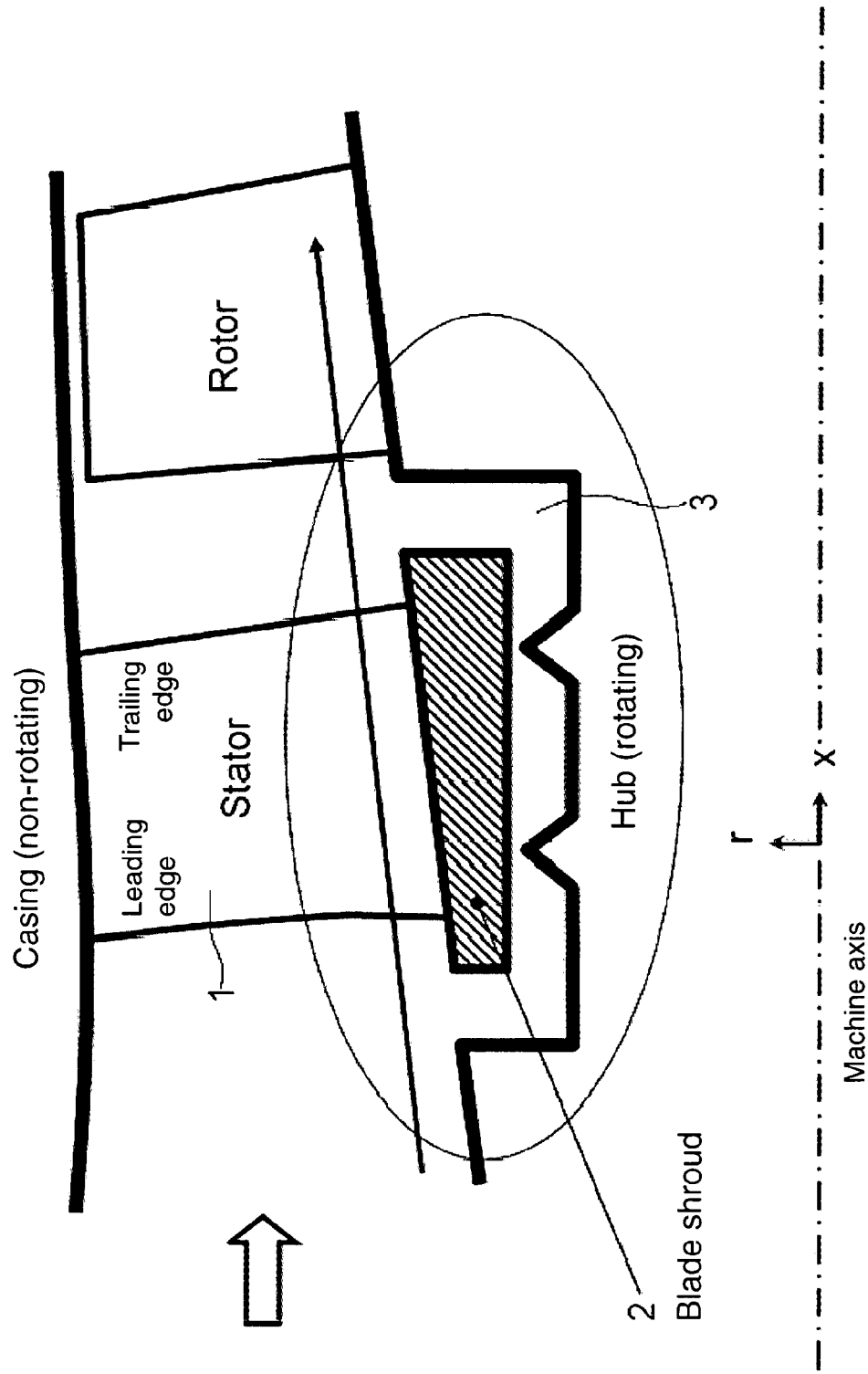
Figure 1C:
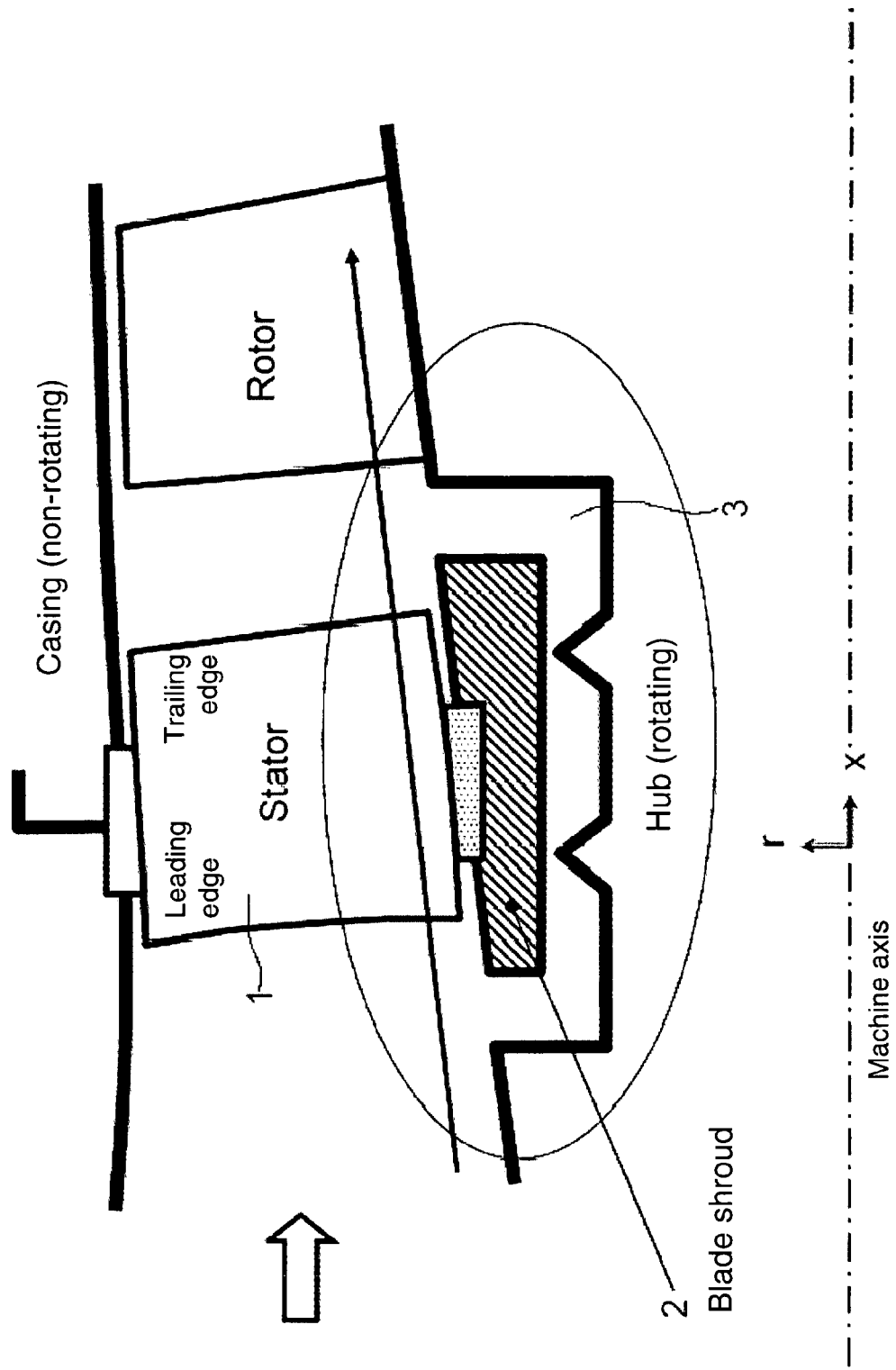
Figure 1D:
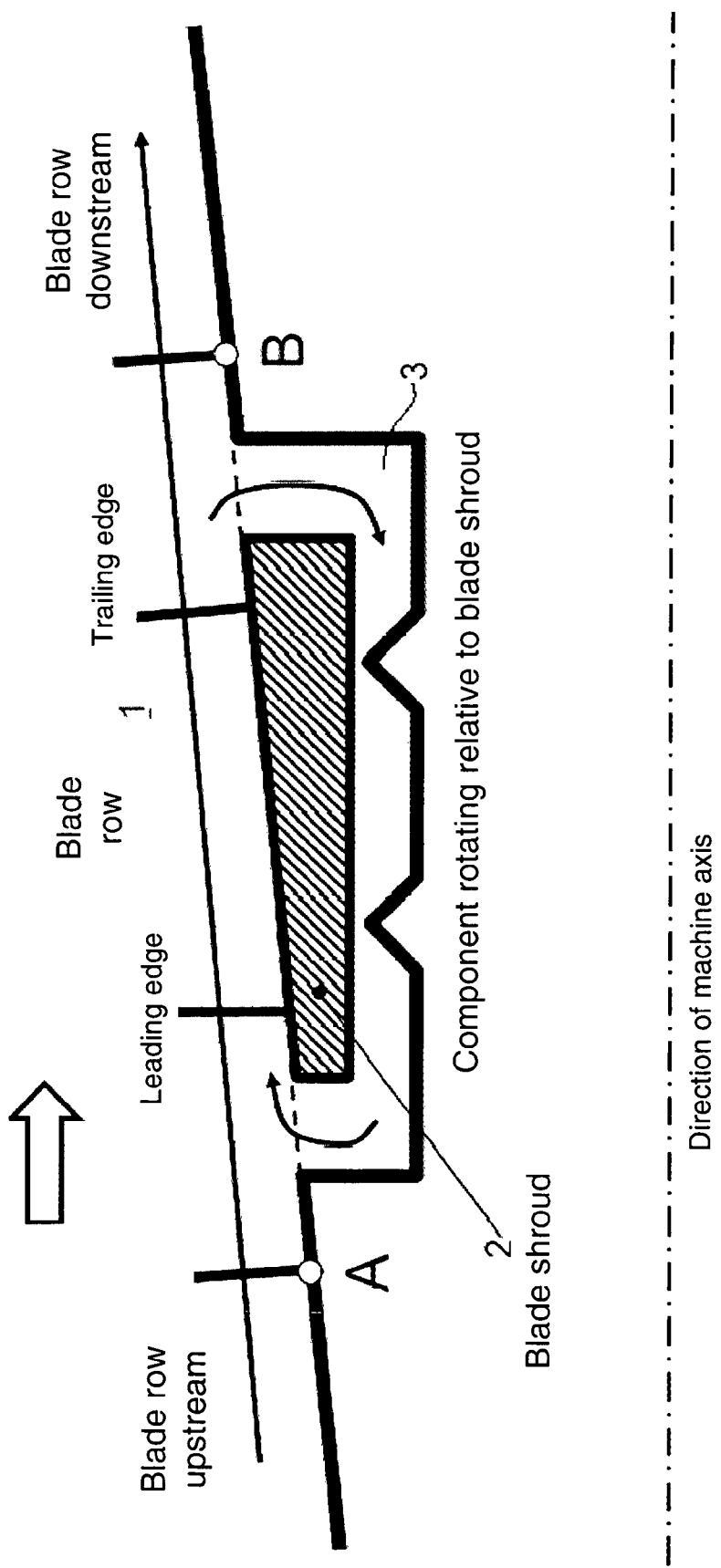
Figure 1E:
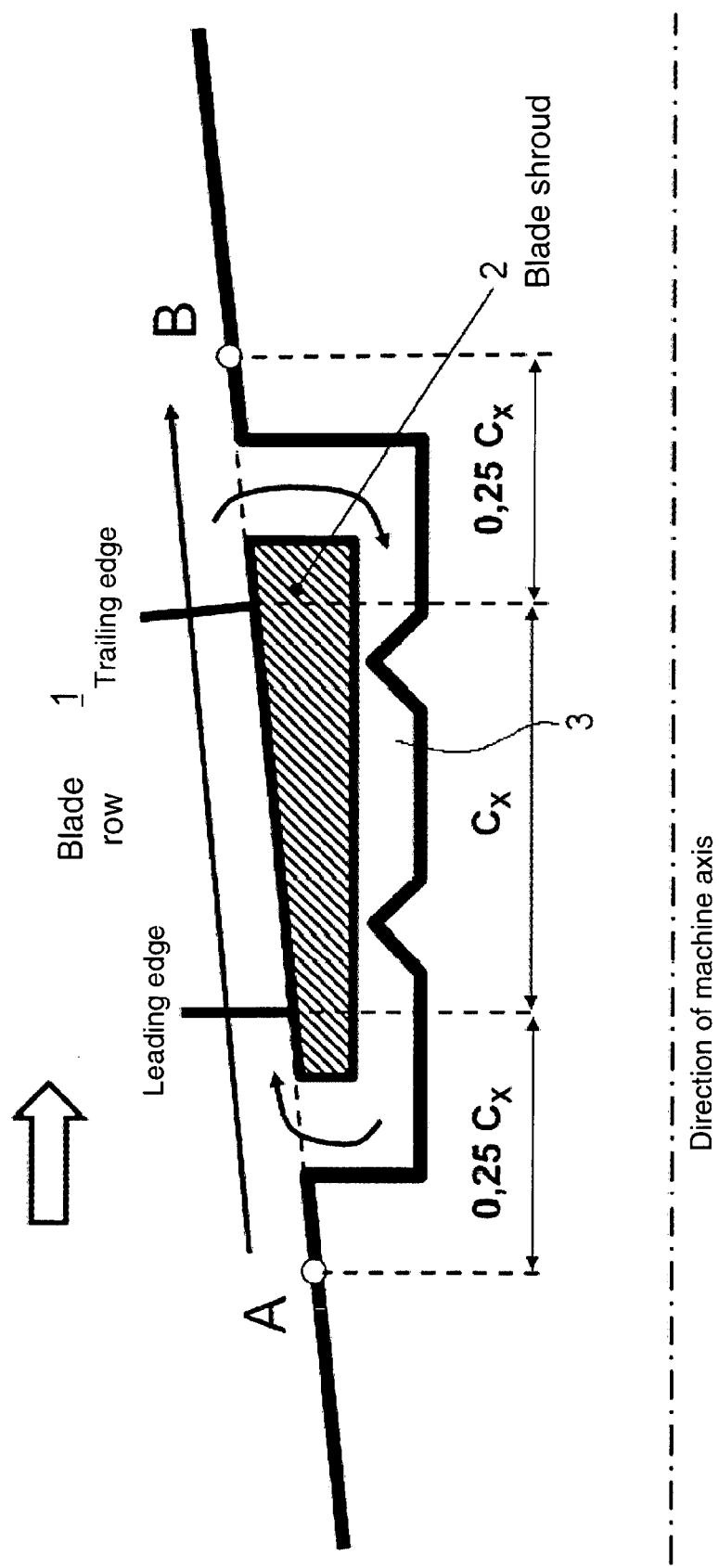
Figure 3A:
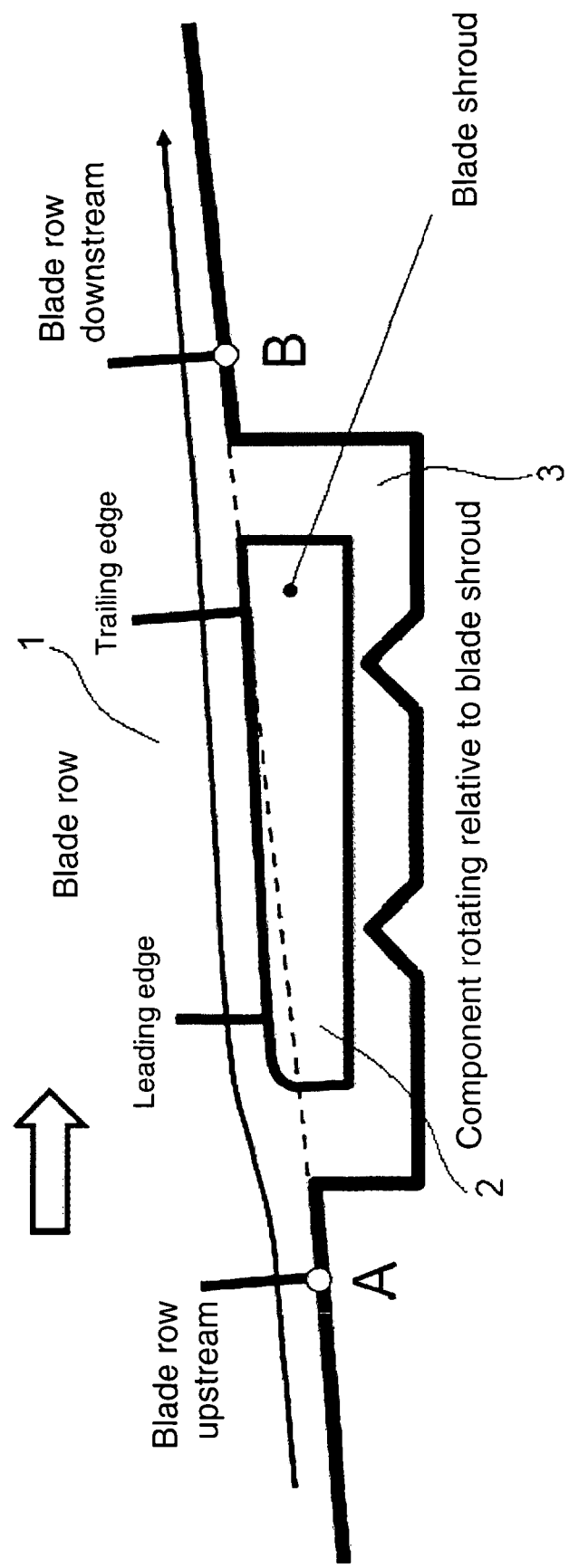
FIG. 3a shows a solution according to the present invention in which the protruding inflow edge of the shroud 2 is radiused for improved flow control, with the radius being endable upstream or also downstream of the blade leading edge.
Figure 3B:
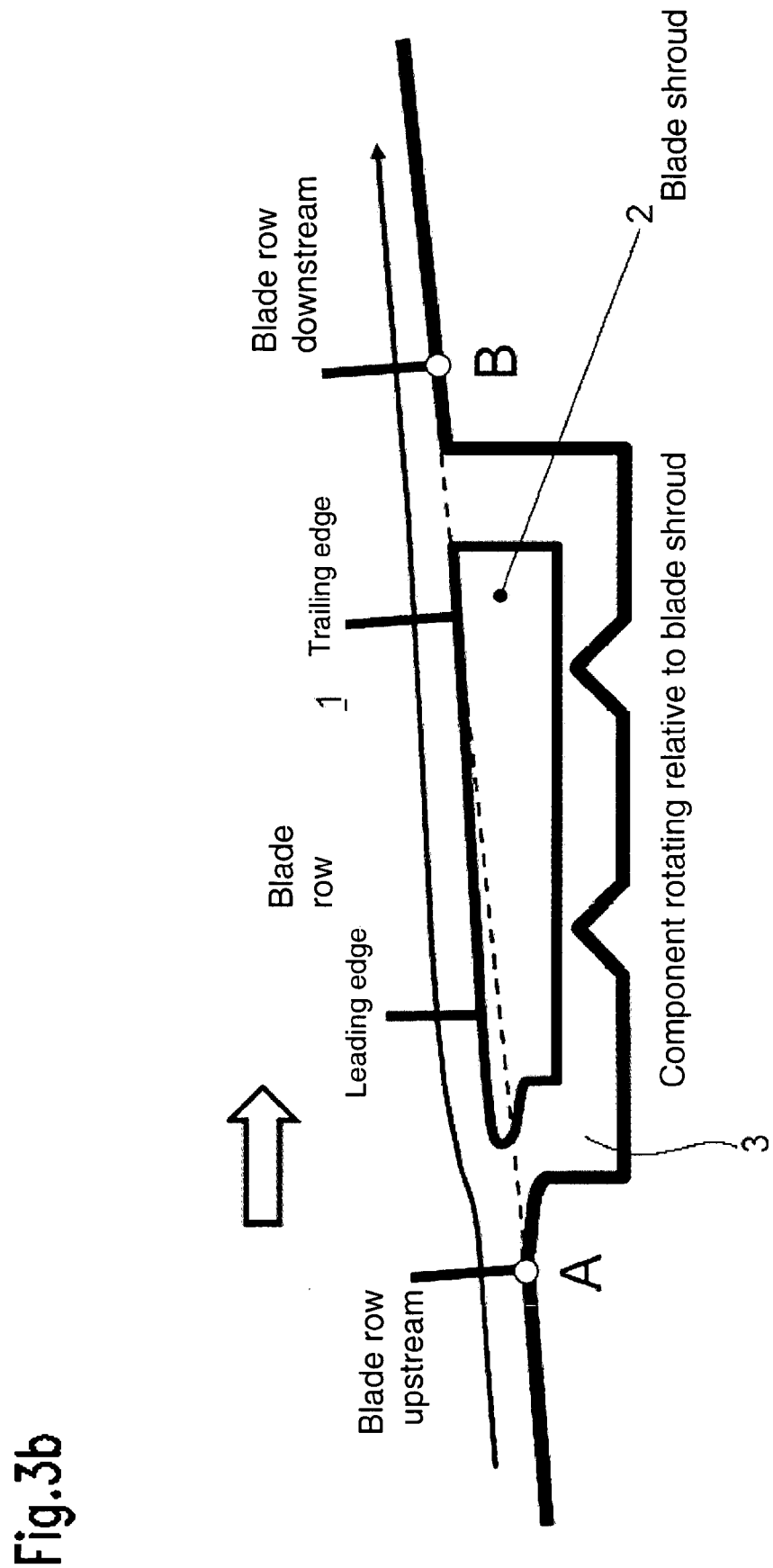
FIG. 3b shows a solution according to the present invention in which the protruding inflow edge of the shroud 2 is provided with a nose for stagnation point formation and improved flow control, with the rounding of said nose being endable on the side facing the main flow path upstream or also downstream of the blade leading edge.
Figure 3C:
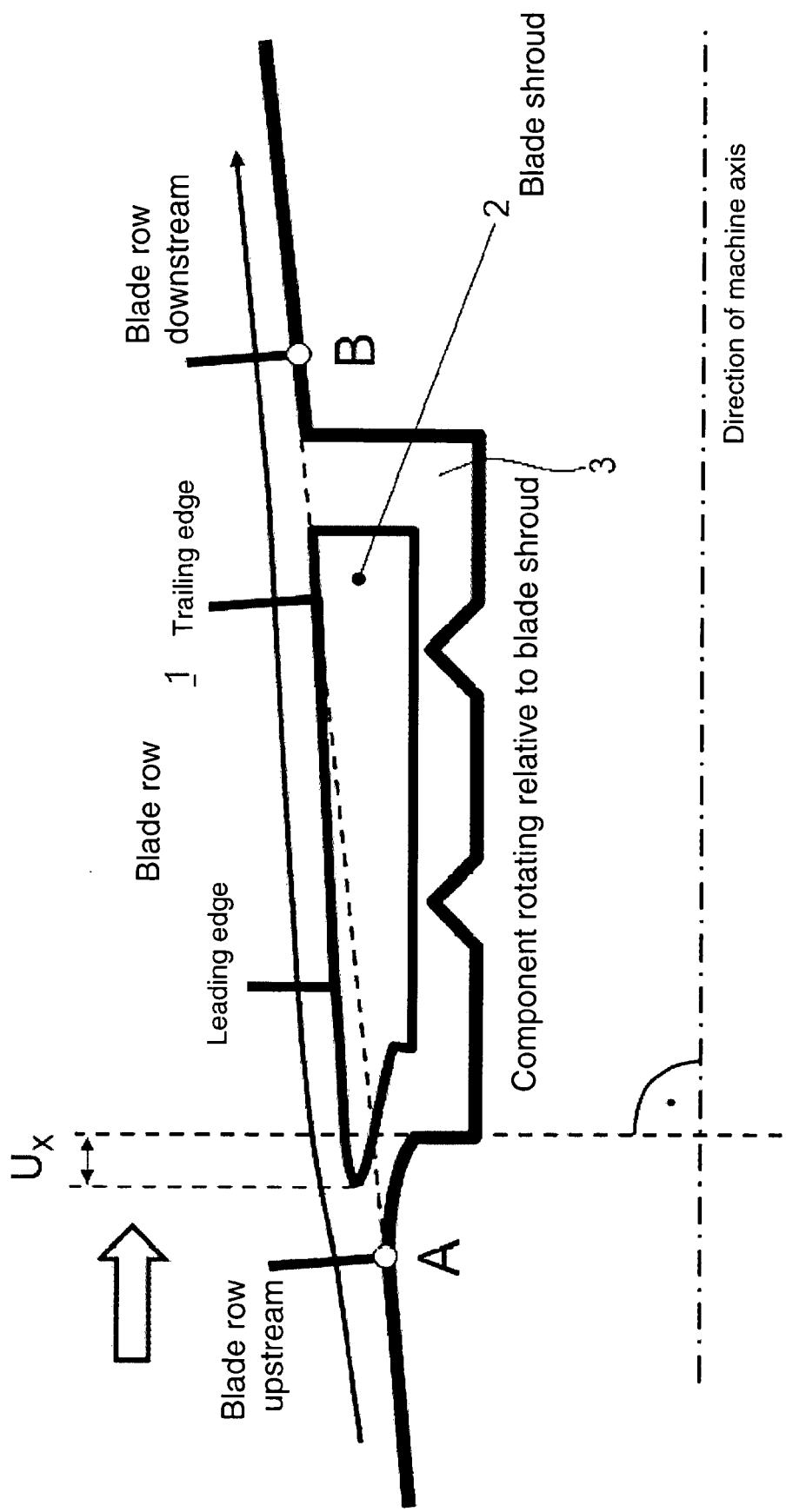

FIG. 3c shows a solution according to the present invention in which the protruding inflow edge of the shroud 2 is provided with an overlap Ux for stagnation point formation and improved flow control. The overlap is characterized in that the wall of the cavity 3 which confines in the upstream direction is not completely radial and rectilinear, but is oriented at least locally obliquely in the upstream direction, so that an again oblique shape of the shroud 2 on the side facing away from the main flow path provides for a duct between the shroud 2 and the surrounding component which is inclined against the radial direction and, if applicable, curved.

FIGS. 4a to 4e show, by way of example, some shroud configurations according to the present invention with protrusion in the area of the trailing edge of the respective blade row. A protrusion according to the present invention is characterized in that—in at least one freely selectable longitudinal section of the fluid-flow machine—a portion of the shroud projects beyond the connecting line A-B into the main flow path, thereby presenting a recess of the flow-limiting contour.

FIG. 4a shows a solution according to the present invention in which the outflow edge of the shroud is essentially blunted.

Figure 4B:
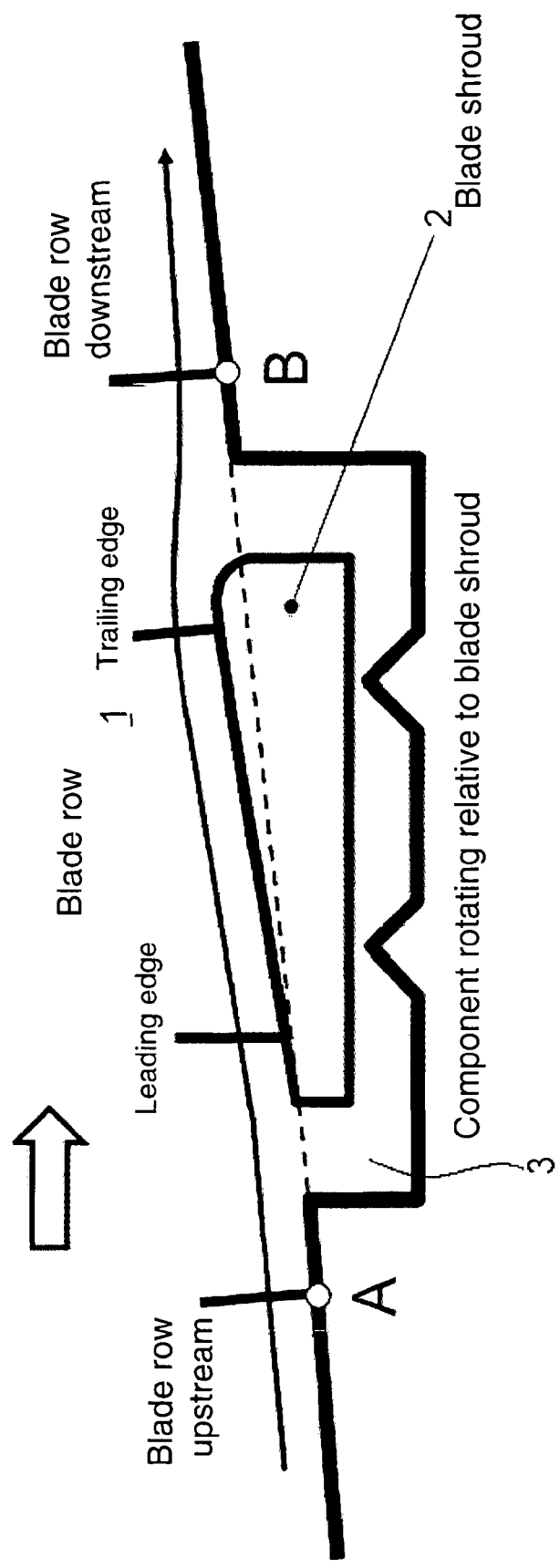

FIG. 4b shows a solution according to the present invention in which the outflow edge of the shroud is radiused for improved flow control, with the radius being endable upstream or also downstream of the blade trailing edge.

Figure 4C:
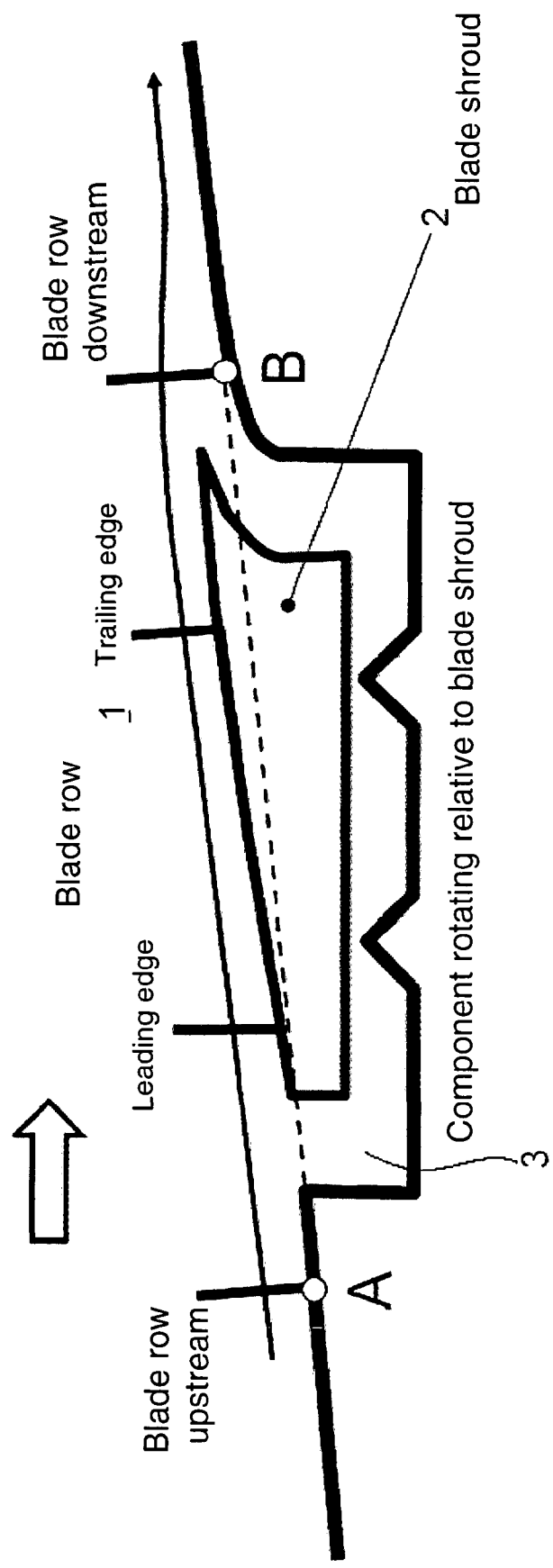

FIG. 4c shows a solution according to the present invention in which the outflow edge of the shroud is essentially sharp-edged.

Figure 4D:
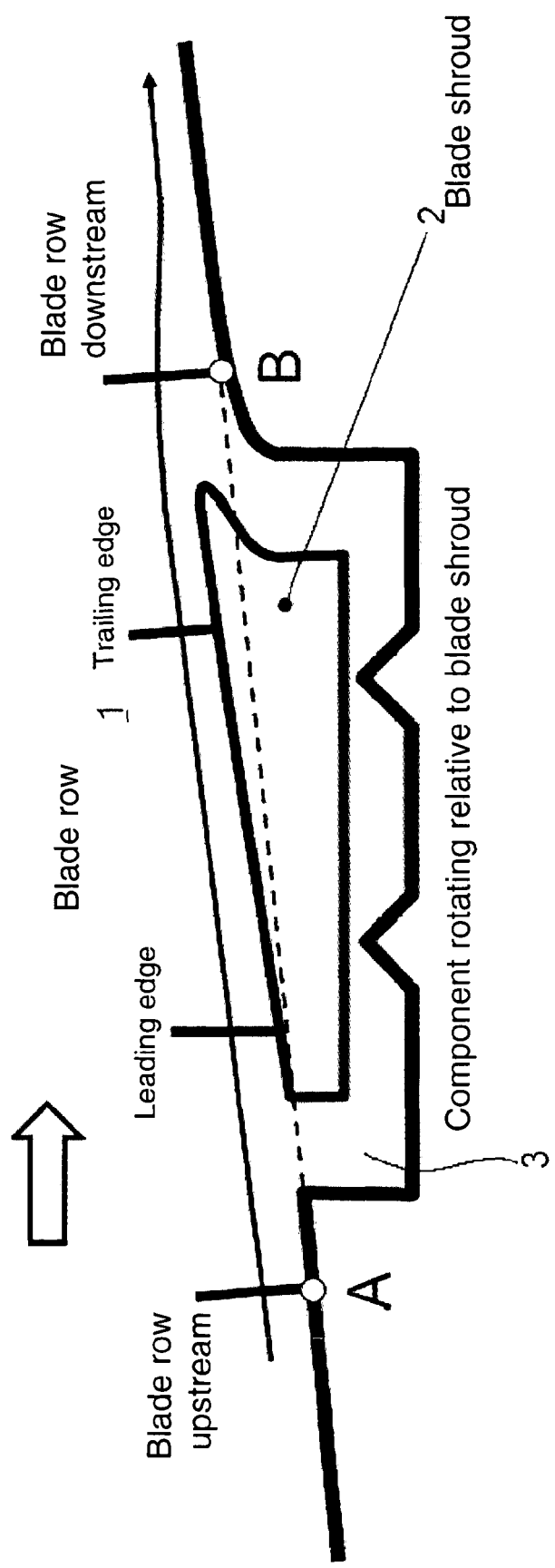

FIG. 4d shows a solution according to the present invention in which the outflow edge of the shroud is provided with a nose for improved flow control, with the rounding of said nose being endable on the side facing the main flow path upstream or also downstream of the blade trailing edge.

FIG. 4e shows a solution according to the present invention in which the outflow edge of the shroud is provided with an overlap Ux. The overlap is characterized in that the wall of the cavity which confines in the downstream direction is not completely radial and rectilinear, but is oriented at least locally obliquely in the downstream direction, so that an again oblique shape of the shroud on the side facing away from the main flow path provides for a duct between the shroud and the surrounding component which is inclined against the radial direction and, if applicable, curved.

FIGS. 5a to 5d show, by way of example, some shroud configurations according to the present invention with protrusion in the area of the leading edge and in the area of the trailing edge of the respective blade row. A protrusion according to the present invention is characterized in that—in at least one freely selectable longitudinal section of the fluid-flow machine—a portion of the shroud projects beyond the connecting line A-B into the main flow path.

FIG. 5a shows a solution according to the present invention in which the protruding inflow edge of the shroud is radiused for improved flow control, in which the outflow edge of the shroud is nose-shaped, and in which the contour of the shroud facing the main flow path extends essentially rectilinearly within the blade row.

FIG. 5b shows a solution according to the present invention in which the contour of the shroud facing the main flow path extends essentially in a concave manner within the blade row.

Figure 5C:
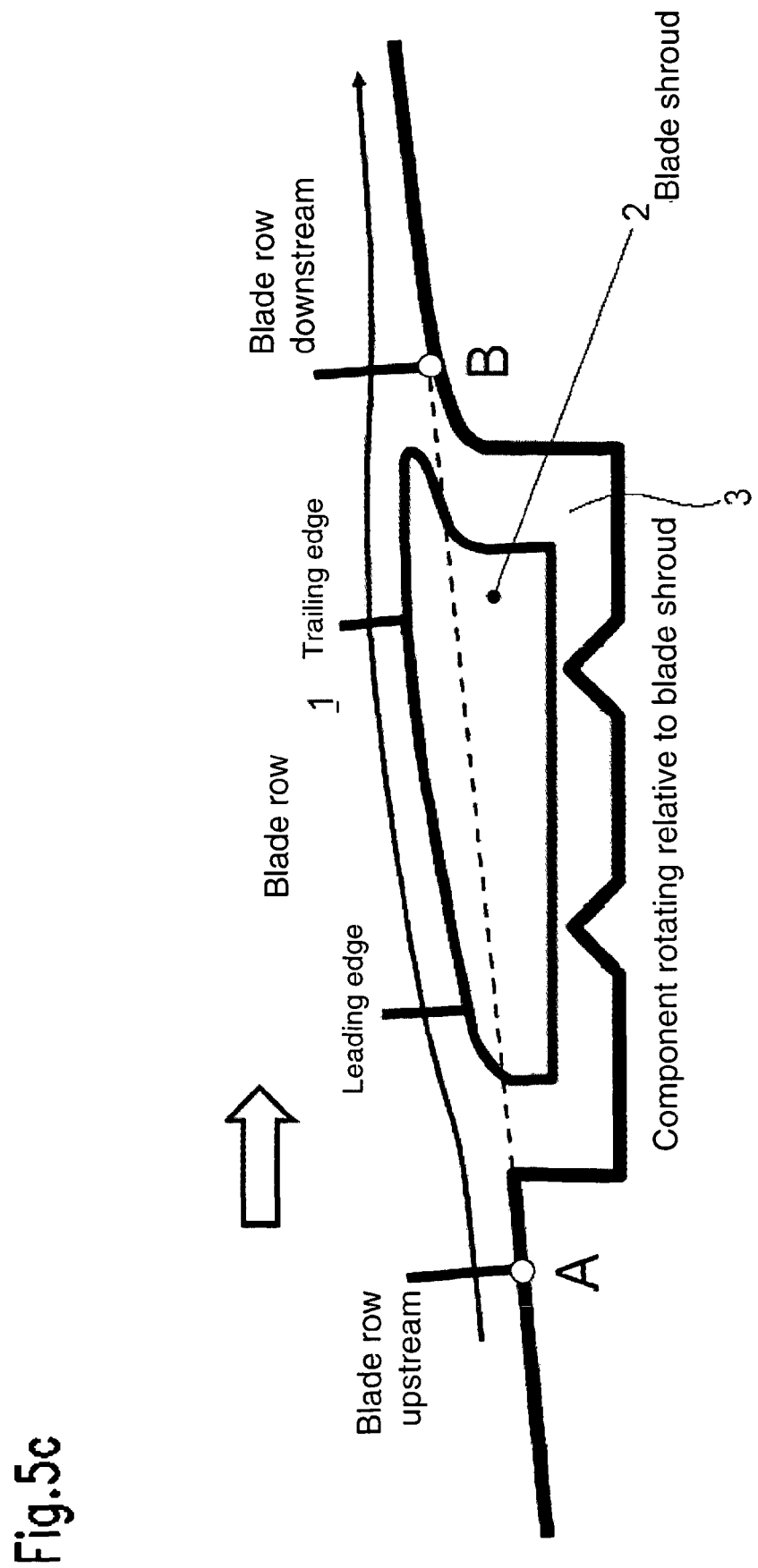

FIG. 5c shows a solution according to the present invention in which the contour of the shroud facing the main flow path extends essentially in a convex manner within the blade row.

Figure 5D:
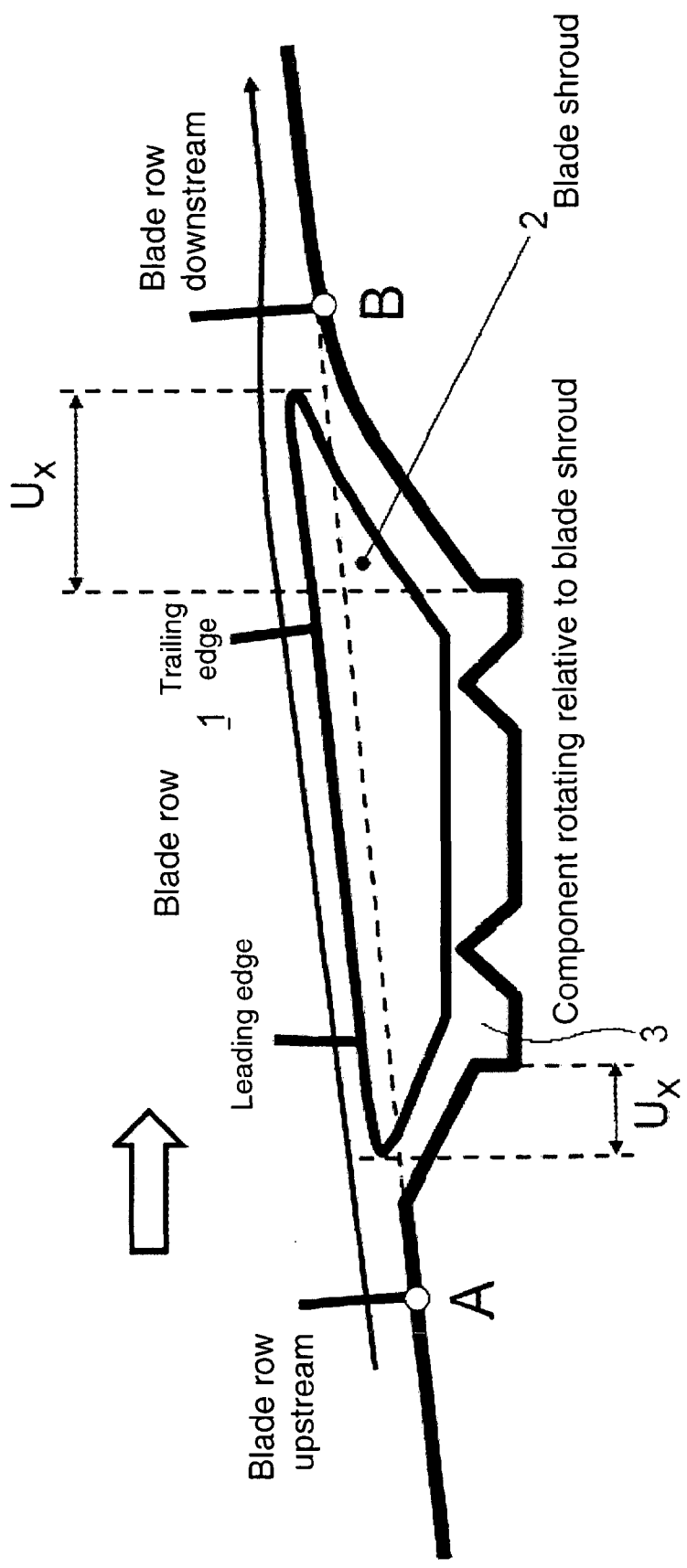

FIG. 5d shows a solution according to the present invention in which the protruding inflow edge of the shroud and also the protruding outflow edge of the shroud are provided with an overlap for improved flow control and in which the contour of the shroud facing the main flow path extends essentially rectilinearly within the blade row.

FIG. 6a and FIG. 6b define sizes for quantifying shroud protrusion.

FIG. 6a shows a configuration with shroud protrusion in the leading edge area. A tangent to the location of maximum shroud protrusion extending parallelly to the connecting line A-B defines the size of shroud protrusion. The size of maximum protrusion dVK is, in accordance with the present invention, established relative to the annulus width WVK at the leading edge. The annulus width WVK is defined as the diameter of a circle inscribed in the annulus (main flow path) with the center MVK on the leading edge. The following applies according to the present invention: $dVK/WVK > 0.01$.

FIG. 6b shows a configuration with shroud protrusion in the trailing edge area. A tangent to the location of maximum shroud protrusion extending parallelly to the connecting line A-B defines the size of shroud protrusion. The size of maximum protrusion dHK is, in accordance with the present invention, established relative to the annulus width WHK at the trailing edge. The annulus width WHK is defined as the diameter of a circle inscribed in the annulus (main flow path) with the center MHK on the trailing edge. The following applies according to the present invention: $dHK/WHK > 0.01$.

If the maximally found protrusion within the blade row is between leading edge and trailing edge, the shroud protrusion in the leading edge area, dVK is established directly on the leading edge and the shroud protrusion in the trailing edge area dHK is established directly on the trailing edge.

FIG. 7 defines favorable axial extensions of the shroud with protrusion according to the present invention. Because of the pressure field created by the shroud protrusion in the area of the shroud edges, it is particularly favorable to provide a comparatively long free section XVK of the shroud upstream of the blade leading edge. As becomes apparent from FIG. 7, this free section should, in accordance with the present invention, be at least 7 percent of the axial extension of the blade row at the periphery of the main flow path.

For the same reasons it is favorable to provide a comparatively long free section XHK of the shroud downstream of the blade trailing edge. As becomes apparent from FIG. 7, this free section should, in accordance with the present invention, be at least 7 percent of the axial extension of the blade row at the periphery of the main flow path.

Figure 8:
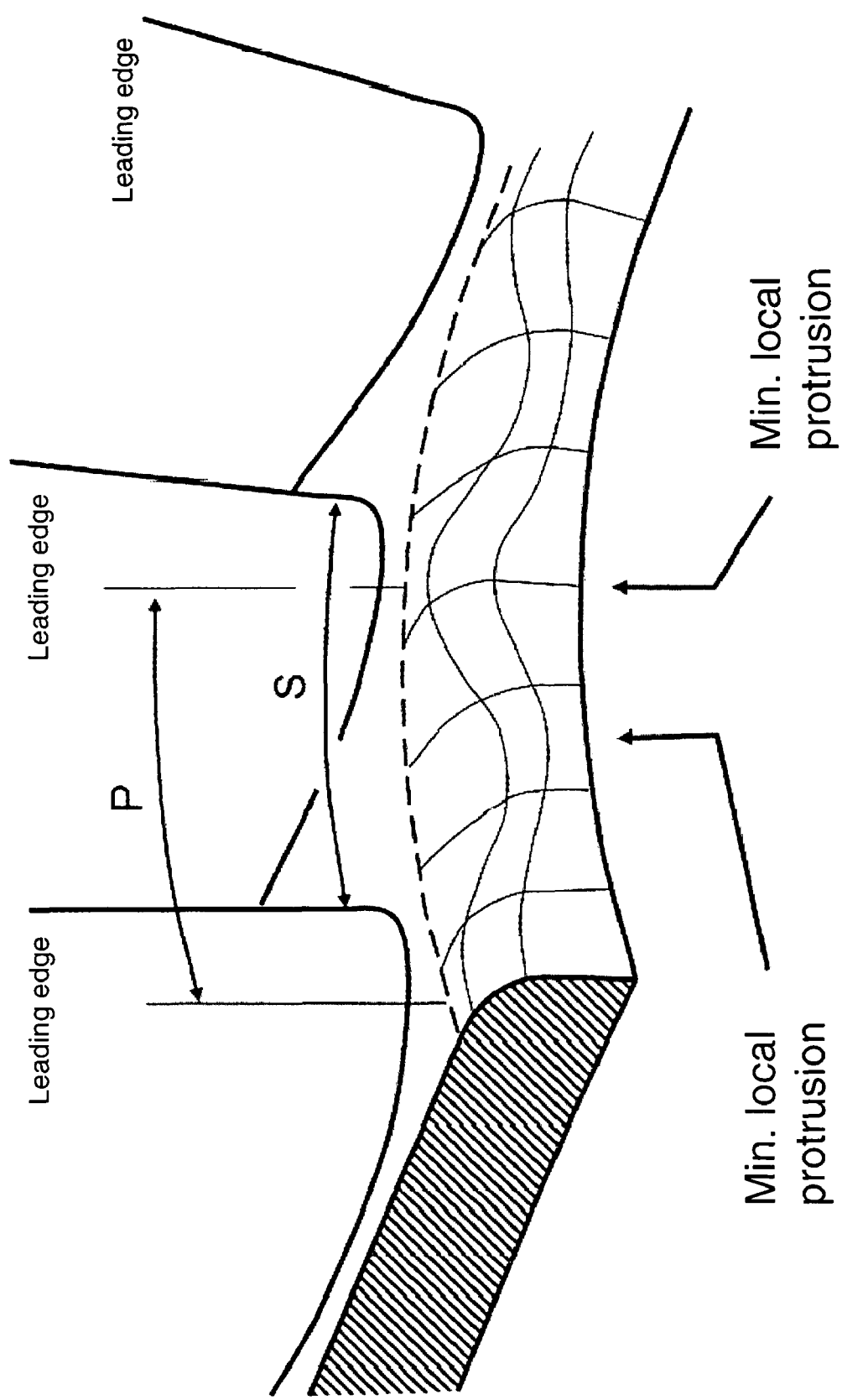

FIG. 8 shows, in three-dimensional view, the leading edge area of a shrouded blade row over a part of the circumference. Here, the shroud protrusion according to the present invention is particularly favorably designed in that the shroud protrusion and the shape of the inflow edge of the shroud according to the present invention periodically vary in circumferential direction of the blade row to which the shroud belongs. It is advantageous in accordance with the present invention if a full period, or also a multiple of the period of said protrusion variation, essentially agrees with a blade spacing S of the respective blade row: $n \times P = S$. The representation in FIG. 8 shows the concept according to the present invention on the example of the leading edge region of a shrouded blade row, with the description provided herein being also applicable to a shroud protrusion in the trailing edge area.

Further Description of the Present Invention:
1. A shroud of a blade row of rotatable or non-rotatably fixed stator or rotor blades for use in a fluid-flow machine, in particular in an aircraft engine compressor, with special shape to reduce leakage flow, where
   a.) the shroud, as viewed in a longitudinal section of the fluid-flow machine, is at least partly embedded in a component or component assembly, a rotating shaft or a stationary casing, thus forming a cavity (recess) connecting to the main flow path,
   b.) the shroud, as viewed in the direction of the machine axis, is arranged between two reference points A and B located at the periphery of the main flow path of the fluid-flow machine,
   c.) the reference point A is established by the base point of the trailing edge of the blade row located upstream of the shroud or, in the absence of this blade row, by a peripheral point of the main flow path which is located upstream of the leading edge of the shrouded blade row, actually by 25 percent of the axial extension of the shrouded blade row, d.) the reference point B is established by the base point of the leading edge of the blade row located downstream of the shroud or, in the absence of this blade row, by a peripheral point of the main flow path which is located downstream of the trailing edge of the shrouded blade row, actually by 25 percent of the axial extension of the shrouded blade row, e.) the shroud projects beyond a rectilinear connection of the reference points A and B into the main flow path in at least one location of the circumference and in at least one of the areas of the leading or trailing edge of the appertaining blade row such that the shroud protrusion provides for a sweep of the effective confinement of the main flow path and the flow lines at the periphery of the main flow path in the area of at least one of the openings by which the main flow path connects to the cavity around the shroud.

2. The shroud in accordance with item 1, with the protruding inflow edge of the shroud being radiused for improved flow control, this radius ending upstream or downstream of the blade leading edge.

3. The shroud in accordance with item 1 or 2, with the protruding inflow edge of the shroud being provided with a nose for stagnation point formation and improved flow control, the rounding of said nose ending upstream or downstream of the blade leading edge on the side facing the main flow path.

4. The shroud in accordance with one of the items 1 to 3, with the protruding inflow edge of the shroud being provided with an overlap for stagnation point formation and improved flow control such that, as viewed in the main flow direction, the forward confining wall of the cavity is not orientated radially, but at least locally obliquely in the upstream direction, with the oblique shape of the rear of the shroud in this area accordingly providing for a duct between the shroud and the surrounding component which is inclined against the radial direction and, if applicable, curved.

5. The shroud in accordance with one of the items 1 to 4, with the protruding outflow edge of the shroud being essentially blunted.

6. The shroud in accordance with one of the items 1 to 5, with the protruding outflow edge of the shroud being radiused for improved flow control, this radius ending downstream or upstream of the blade trailing edge.

7. The shroud in accordance with one of the items 1 to 6, with the protruding outflow edge of the shroud being essentially sharp-edged.

8. The shroud in accordance with one of the items 1 to 7, with the protruding outflow edge of the shroud being provided with a nose for improved flow control, the rounding of said nose ending downstream or upstream of the blade trailing edge on the side facing the main flow path.

9. The shroud in accordance with one of the items 1 to 8, with the outflow edge of the shroud being provided with an overlap for improved flow control such that, as viewed in the main flow direction, the rearward confining wall of the cavity is not orientated radially, but at least locally obliquely in the downstream direction, with the oblique shape of the rear of the shroud in this area accordingly providing for a duct between the shroud and the surrounding component which is inclined against the radial direction and, if applicable, curved.

10. The shroud in accordance with one of the items 1 to 9, with both, a shroud protrusion in the leading-edge area and a shroud protrusion in the trailing-edge are being provided.

11. The shroud in accordance with item 10, with the shroud contour facing the main flow path extending essentially rectilinearly in at least one partial section between the inflow and the outflow edge of the shroud.

12. The shroud in accordance with item 10, with the shroud contour facing the main flow path extending essentially in a concave manner in at least one partial section between the inflow and the outflow edge of the shroud.

13. The shroud in accordance with item 10, with the shroud contour facing the main flow path extending essentially in a convex manner in at least one partial section between the inflow and the outflow edge of the shroud.

14. The shroud in accordance with item 10, with the protruding inflow edge of the shroud and also the protruding outflow edge of the shroud being provided with overlaps, and the overlaps being designed such that an essentially V-shaped cavity is provided around the shroud.

15. The shroud in accordance with one of the items 1 to 14, with a shroud protrusion provided, as well as the shape of the shroud edge concerned, varying periodically in the circumferential direction of the blade row to which the shroud belongs.

16. The shroud in accordance with item 15, with the period P of the circumferential variation of the shroud protrusion and the shroud edge shape being in integer relation to the blade spacing S of the shrouded blade row: $n \times P = S$.

17. The shroud in accordance with one of the items 1 to 16, with the shroud protrusion d, defined as distance between the reference line A-B and a parallelly extending tangent to the location of maximum shroud protrusion, and related to the annulus width W at the blade edge (VK or HK) nearest to the location of maximum protrusion, is more than 1 percent ($dVK/WVK > 0.01$ resp. $dHK/WHK > 0.01$), with the reservation that the shroud protrusion in the leading edge area dVK is to be established directly on the blade leading edge and the shroud protrusion in the trailing edge area dHK is to be established directly on the blade trailing edge, if the location of the maximum shroud protrusion within the blade row is between leading and trailing edge.

18. The shroud in accordance with one of the items 1 to 17, with a free section XVK of the shroud being provided upstream of the blade leading edge whose length in relation to the axial extension of the blade row at the periphery of the main flow path (VK to HK) is at least 7 percent.

19. The shroud in accordance with one of the items 1 to 17, with a free section XHK of the shroud being provided downstream of the blade trailing edge whose length in relation to the axial extension of the blade row at the periphery of the main flow path (VK to HK) is at least 7 percent.

The present invention provides for a significantly higher aerodynamical loadability of rotors and stators in fluid-flow machines, with efficiency being maintained or even improved. Application of the concept to the high-pressure compressor of an aircraft engine with approx. 25,000 lbs thrust leads to a reduction of the specific fuel consumption of up to 0.5 percent.

What is claimed is:

1. A fluid-flow machine having a main flow path, in which at least one row of blades is arranged, and a shroud embedded in a cavity of a component, with the component and the blades being in rotary movement relative to each other, wherein:
   the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein the shroud is positioned in a portion of the fluid-flow machine that adds energy to fluid in the main flow path and the projection of the shroud into the main flow path reduces a pressure differential between a trailing edge of the cavity and a leading edge of the cavity to reduce a leakage flow through the cavity.

2. The fluid-flow machine of claim 1, wherein an outflow edge of the shroud is protruding and essentially blunted.

3. The fluid-flow machine of claim 1, wherein an outflow edge of the shroud is protruding and radiused for improved flow control.

4. The fluid-flow machine of claim 1, wherein an outflow edge of the shroud is protruding and essentially sharp-edged.

5. The fluid-flow machine of claim 1, wherein an outflow edge of the shroud is protruding and provided with a nose for improved flow control.

6. The fluid-flow machine of claim 1, wherein an outflow edge of the shroud is provided with an overlap such that, as viewed in the main flow direction, a rearward confining wall of the cavity is not orientated radially, but at least locally obliquely in a downstream direction, with an oblique shape of a rear of the shroud in this area accordingly providing for a duct between the shroud and the surrounding component which is at least one of inclined against the radial direction and curved.

7. The fluid-flow machine of claim 1, and further including a shroud protrusion in a leading-edge area and a shroud protrusion in a trailing-edge area of the blade.

8. The fluid-flow machine of claim 1, wherein a shroud contour facing the main flow path extends essentially rectilinearly in at least one partial section between an inflow and an outflow edge of the shroud.

9. The fluid-flow machine of claim 1, wherein a shroud contour facing the main flow path extends essentially in a concave manner in at least one partial section between an inflow edge and an outflow edge of the shroud.

10. The fluid-flow machine of claim 1, wherein a shroud contour facing the main flow path extends essentially in a convex manner in at least one partial section between an inflow edge and an outflow edge of the shroud.

11. The fluid-flow machine of claim 1, wherein an inflow edge of the shroud and also an outflow edge of the shroud are protruding and overlap the component to form an essentially V-shaped cavity around the shroud.

12. The fluid-flow machine of claim 1, wherein a protruding inflow edge of the shroud is radiused for improved flow control.

13. The fluid-flow machine of claim 12, wherein the protruding inflow edge of the shroud includes a nose for stagnation point formation and improved flow control.

14. The fluid-flow machine of claim 13, wherein the protruding inflow edge of the shroud is provided with an overlap for stagnation point formation and improved flow control such that, as viewed in the main flow direction, a forward confining wall of the cavity is not orientated axially, but at least locally obliquely in an upstream direction, with an oblique shape of a rear of the shroud in this area accordingly providing for a duct between the shroud and the surrounding component which is at least one of inclined against a radial direction and curved.

15. The fluid-flow machine of claim 1, wherein a shroud protrusion, as well as a shape of a shroud edge concerned, vary periodically in a circumferential direction of a blade row to which the shroud belongs.

16. The fluid-flow machine of claim 15, wherein a period (P) of the circumferential variation of the shroud protrusion and the shroud edge shape are in integer relation to a blade spacing (S) of the shrouded blade row and the following equation applies:

$$n \cdot P = S.$$

17. The fluid-flow machine of claim 1, wherein the shroud includes a protrusion d, defined as a distance between the reference line A-B and a parallelly extending tangent to a location of maximum shroud protrusion, and related to an annulus width W at a blade edge (leading edge (VK) or trailing edge (HK)) nearest to the location of maximum shroud protrusion, is more than 1 percent and the following equations apply:

$$d\text{VK}/W\text{VK} > 0.01 \text{ resp.}$$

$$d\text{HK}/W\text{HK} > 0.01,$$

with the shroud protrusion in the leading edge area dVK being established directly on the blade leading edge and the shroud protrusion in the trailing edge area dHK being established directly on the blade trailing edge, if the location of the maximum shroud protrusion within the blade row is between leading and trailing edges.

18. The fluid-flow machine of claim 17, and further including a free section (XVK) of the shroud provided upstream of the blade leading edge whose length in relation to an axial extension of the blade row at a periphery of the main flow path (leading edge (VK) to trailing edge (HK)) is at least 7 percent.

19. The fluid-flow machine of claim 17, and further including a free section (XHK) of the shroud provided downstream of the blade trailing edge whose length in relation to the axial extension of the blade row at the periphery of the main flow path (leading edge (VK) to trailing edge (HK)) is at least 7 percent.

20. A fluid-flow machine having a main flow path, in which at least one row of blades is arranged, and a shroud embedded in a cavity of a component, with the component and the blades being in rotary movement relative to each other, wherein the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein the protruding inflow edge of the shroud includes a nose for stagnation point formation and improved flow control;

wherein the protruding inflow edge of the shroud is provided with an overlap for stagnation point formation and improved flow control such that, as viewed in the main flow direction, a forward confining wall of the cavity is not orientated axially, but at least locally obliquely in an upstream direction, with an oblique shape of a rear of the shroud in this area accordingly providing for a duct between the shroud and the surrounding component which is at least one of inclined against a radial direction and curved.

21. A fluid-flow machine having a main flow path, in which at least one row of blades is arranged, and a shroud embedded in a cavity of a component, with the component and the blades being in rotary movement relative to each other, wherein the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein an outflow edge of the shroud is provided with an overlap such that, as viewed in the main flow direction, a rearward confining wall of the cavity is not orientated radially, but at least locally obliquely in a downstream direction, with an oblique shape of a rear of the shroud in this area accordingly providing for a duct between the shroud and the surrounding component which is at least one of inclined against the radial direction and curved.

22. A fluid-flow machine having a main flow path, in which at least one row of blades is arranged, and a shroud embedded in a cavity of a component, with the component and the blades being in rotary movement relative to each other, wherein the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein an inflow edge of the shroud and also an outflow edge of the shroud are protruding and overlap the component to form an essentially V-shaped cavity around the shroud.

23. A fluid-flow machine having a main flow path, in which at least one row of blades is arranged, and a shroud embedded in a cavity of a component, with the component and the blades being in rotary movement relative to each other, wherein the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein a shroud protrusion, as well as a shape of a shroud edge concerned, vary periodically in a circumferential direction of a blade row to which the shroud belongs.

24. A fluid-flow machine having a main flow path, in which at least one row of blades is arranged, and a shroud embedded in a cavity of a component, with the component and the blades being in rotary movement relative to each other, wherein the shroud, as referred to a longitudinal section of the fluid-flow machine, is at least partly embedded in the component, forming a cavity connecting to the main flow path, the shroud, as referred to an axial direction of the fluid-flow machine is arranged between two reference points (A) and (B) at a periphery of the main flow path of the fluid-flow machine, the reference point (A) is established by at least one of a base point of a trailing edge of a blade row located upstream of the shroud or a peripheral point of the main flow path which is located upstream of a leading edge of the shrouded blade row by 25 percent of an axial extension of the shrouded blade row, the reference point (B) is established by at least one of a base point of a leading edge of the blade row located downstream of the shroud or a peripheral point of the main flow path which is located downstream of a trailing edge of the shrouded blade row by 25 percent of the axial extension of the shrouded blade row, the shroud projects beyond a rectilinear connection of the reference points (A) and (B) into the main flow path in at least one location of the circumference and in at least one of the areas of the leading or trailing edge of the appertaining blade row such that the shroud protrusion provides for a sweep of the effective confinement of the main flow path and curving of the flow lines at the periphery of the main flow path in the area of at least one of the openings by which the main flow path connects to the cavity around the shroud;

wherein the shroud includes a protrusion d, defined as a distance between the reference line A-B and a parallelly extending tangent to a location of maximum shroud protrusion, and related to an annulus width W at a blade edge (leading edge (VK) or trailing edge (HK)) nearest to the location of maximum shroud protrusion, is more than 1 percent and the following equations apply:

$$d\text{VK}/W\text{VK} > 0.01 \text{ resp.}$$

$$d\text{HK}/W\text{HK} > 0.01,$$

with the shroud protrusion in the leading edge area dVK being established directly on the blade leading edge and the shroud protrusion in the trailing edge area dHK being established directly on the blade trailing edge, if the location of the maximum shroud protrusion within the blade row is between leading and trailing edges.

* * * * *